United States Patent Office 2,953,536
Patented Sept. 20, 1960

2,953,536

UNSATURATED ETHERS OF AMINOTRIAZINE FORMALDEHYDE CONDENSATION PRODUCTS AND OXIDATIVE DRYING COMPOSITIONS CONTAINING SUCH ETHERS

Gustav Widmer, Basel, Switzerland, assignor to Ciba Limited, Basel, Switzerland, a firm of Switzerland No Drawing. Filed Feb. 19, 1958, Ser. No. 716,023

Claims priority, application Switzerland Mar. 1, 1957

14 Claims. (Cl. 260—21)

The manufacture of aminotriazine-formaldehyde condensation products etherified with allyl alcohol is known. Furthermore, oxidatively drying compositions containing such allyl alcohol etherified condensation products and a metal siccative are also known. The allyl alcohol etherified condensation products, however, have the drawback that they are frequently only insufficiently compatible with drying oils and oil-modified alkyd resins. Besides, the undesirable physiological properties of allyl alcohol can render the preparation of the aminotriazine-methylolallyl ethers harmful for the operators.

The present invention is based on the observation that these disadvantages are negligible, if occurring at all, in compositions in which there is used, instead of allyl alcohol, 2-butene-1-ol.

The present invention provides 2-butene-1-ol ethers of an aminotriazine (containing at least two amino groups)-formaldehyde condensation product, that contain for each amino group at least one butenyl ether group.

The unsaturated ethers of aminotriazine-formaldehyde condensation products of the present invention may be prepared by reacting a hardenable formaldehyde condensation product of an aminotriazine containing at least two amino groups, which products contains for each amino group, of the amino-triazine at least one methylol group or at least one methylol group etherified with a saturated aliphatic alcohol containing from 1 to 4 carbon atoms, in the presence of an acid, and advantageously at a temperature of below 50° C., with 2-butene-1-ol in such proportion that in the resulting ether there is present at least one butenyl ether group for each amino group of the aminotriazine. Advantaegously, the reaction mixture is then neutralized, filtered and water and excess 2-butene-1-ol removed from the filtrate under reduced pressure. The etherification may be carried out in a simple manner in the presence of concentrated hydrochloric acid with prolonged stirring, for example, for 1 to 2 hours, of both components at room temperature. Then the reaction product, after neutralization, is freed from water and excess 2-butene-1-ol under vacuum.

As hardenable formaldehyde condensation products of aminotriazines containing at least two amino groups suitable for etherification with 2-butene-1-ol, there come into consideration those which contain for each amino group of the aminotriazine at least one free methylol group or methylol group etherified with a low molecular alcohol as for example, a methylol group etherified with methanol, and those which in adidtion to such methylol groups also contain methylol groups etherified with other alcohols. As aminotriazines which contain at least two amino groups there are to be understood in principle all which are convertible by formaldehyde into the corresponding methylol compounds and which can then be etherified, for example, N-phenyl-melamine, benzoguanamine, adipoguanamine, acetoguanamine, formoguanamine, ammeline, 2:4-diamino-6-chloro-1:3:5-melamine, and, above all, melamine.

The ethers of the invention are clear, water-white syrups. They possess the valuable property in the presence of cobalt compounds as, for example, cobalt naphthenate or cobalt-2-ethyl-hexanate, of showing a strong polymerization power at room temperature and, for example, of giving air drying coatings which are already dust-dry and pressure-resistant after a few hours and at the latest after a few days are scratch-resistant and largely insoluble in water and solvents. This behavior is in contrast to that of aminotriazine-formaldehyde condensation products etherified with an isomer of 2-butene-1-ol, for example, with 3-butene-1-ol or 3-butene-2-ol, which in general exhibit no or practically no useful air-drying properties.

By warming, for example, to 80° C. for 1 hour, this drying action can be considerably accelerated. Whereas at room temperature only a few metal driers come into consideration as having good utility, in addition to cobalt driers, for example, also iron and nickel driers, which latter compounds, however, require a longer drying time, there may also be used at higher temperatures other metal driers especially chromium, aluminum, calcium or driers.

By an addition of peroxides, especially of organic peroxides as, for example, benzoyl peroxide, di-tertiarybutyl peroxide, lauryl peroxide or hydroxy cyclohexylhydroperoxide, the drying can also be accelerated. By increasing the quantity of the metal drier or of the peroxide the drying time can be further shortened.

The simultaneous presence of a metal drier and a peroxide catalyst can, especially at a raised temperature, bring about, in addition to the above-mentioned surface reaction, also a polymerization in the interior of the material.

The butenyl ethers of formaldehyde condensation products of aminotriazines, especially of melamine, in accordance with the present invention, are excellently compatible with many of the usual binding agents and solvents used in the manufacture of synthetic resin compositions. Their oxidative polymerization-ability and drying-properties also remain, as a rule, in mixtures with such binding agents and solvents. The addition of such a butenyl ether, for example, to coating compositions prepared from the usual binding agents gives coatings or films whose hardness and gloss are, as a rule, considerably better than with coatings obtained without the addition of the butenyl ether; frequently there is obtained a coating having a better fastness to light. Furthermore, casting, pressings, laminating, foundation-surfacing, impregnating, cementing, adhesive and similar compositions may be improved in similar manner by the use of the butenyl-ethers. The products manufactured therefrom exhibit, in general, greater surface hardness and abrasion-resistance, better water-, solvent- and chemical-resistance, than the products obtained without the addition of the butenyl ether.

The butenyl ethers may also with advantage be added to binding agents, derived from air-drying oils which respond to driers and thus possess air-drying properties, as, for example, linseed oil, dehydrated castor oil, soya oil, wood oil, furthermore alkyd resins and styrenated oils. Furthermore, nitrocellulose, acetylcellulose, ethyl cellulose, polyvinyl acetate, polyvinyl acetals, polystyrene and similar thermoplastic substances, whose soltuions are not, like the above-mentioned binding agents derived from air-drying oils, themselves oxidative in the air or in an oven, but which dry merely by solvent loss, can by the addition of the butenyl ethers of the invention be improved, especially with regard to hardness and insolubility of coatings or films prepared from them. Finally, there may also be used in combination with such butenyl ethers other compounds polymerizable with peroxides, as, for example, styrene, vinyl esters, acrylic acid esters, acrylonitrile and $\alpha:\beta$-unsaturated polyesters.

The proportion of the butenyl ether added to such compositions depends upon the properties of the other materials used and according to the requirements of the compositions, and may vary within wide limits. Of course, such mixtures may also contain solvents and/or modifying additive agents as, for example, plasticisers, organic or inorganic fillers or pigments.

The butenyl ethers of the invention may be modified by reaction with mono- or poly-hydric alcohols as, for example, ethylene glycol, stearyl alcohol, myricyl alcohol, linoleyl alcohol and incompletely etherified or esterified gycerol, as, for example, its partial ethers with higher fatty alcohols or part esters with higher fatty acids, or with carboxyl-group-contining compounds as, for example saturated or unsaturated fatty acids and resin acids. The corresponding mixed ethers or esterified ethers are useful for the same purposes as the unmodified butenyl ethers and can sometimes be used with advantage in place of the latter.

For coatings, which should dry in the air at room temperature, there are advantageously used products which are extensively etherified with 2-butene-1-ol, while for oven-drying coatings there are quite suitable the products which are less extensively etherified and which harden rapidly in the warm.

Coatings, films and similar products obtainable by air-drying at room temperature or in an oven butenyl ethers treated with cobalt driers alone are in general odorless, water-white, insoluble in organic solvents, water-resistant, resistant to light and show very high final hardness. Their air-drying time may be considerably shortened if the starting product is pre-polymerized, for example, by blowing with air at 150° C., whereby its viscosity is raised. Also an addition of peroxide catalysts, although these in themselves are only slightly effective, can essentially shorten the drying time in the presence of, for example, a cobalt drier.

The following examples illustrate the invention:

*Example 1*

324 parts of hexamethylol-melamine were well stirred with 1290 parts of 2-butene-1-ol and with an addition of 119 parts of hydrochloric acid (of about 36 percent strength) in a flask fitted with a stirrer for 1 hour at 25° C. Then the mixture was neutralized with calcined sodium carbonate to Brilliant yellow-orange red, filtered off from the salt formed and the latter then washed with 2-butene-1-ol. From the clear filtrate a mixture of 2-butene-1-ol and water was now distilled off under a pressure of about 400 mm. of mercury. Finally it was more completely dehydrated by heating on an oil bath to an internal temperature of about 105° C. and under reduced pressure. The cloudy syrup, after standing for several hours, was filtered cold. There were obtained 535 parts of a water-white syrup, which consisted of almost 100 percent of a butenyl ether containing about 4.9 butenyl ether groups per mol of melamine.

10 grams of this butenyl ether were mixed with 10 mg. of cobalt (in the form of the naphthenate drier) and diluted to a pourable viscosity with toluene. It was then poured on to a glass plate and allowed to stand at room temperature. In about 15 hours the coating was dust-dry, after 2-3 days it was thoroughly dry and in about a week it was scratch resistant. It was water-white, showed good evenness of flow and gloss and had good resistance to the action of water and solvents. These properties could be further improved by longer drying.

If to the above-mentioned mixture there were added 400 mg. of benzoyl peroxide, the coating became dust-dry in a shorter time, while with benzoyl peroxide alone no drying occurred.

If the butenyl ether obtained as above was after-treated in a vacuum of about 400 mm. mercury at 130–150° C. for an hour, the viscosity was raised with splitting off of some water and 2-butene-1-ol, whereby a product was obtained the viscosity of which had been raised from about 500 to 10,000 cp. and which contained about 4.3 double bonds per mol of aminotriazine. After addition of cobalt naphthenate and pouring on to a glass plate a coating was obtained which was dust-dry in 2½ hours and scratch-resistant after about 16 hours.

*Example 2*

93.5 parts of benzoguanamine were dissolved with warming in 187 parts of an aqueous 36.8 percent formaldehyde solution whose pH value had been adjusted to 8.5. The solution was heated for 15 minutes at 90° C. and then poured on to sheet metal and dried with a stream of air at room temperature. To the 145 parts of dry tetramethylol-benzoguanamine so obtained there were added 800 parts of 2-butene-1-ol and 59 parts of aqueous, concentrated hydrochloric acid, whereupon the mixture was stirred for 1½ hours at a temperature of 25° C. After neutralizing the mixture with sodium carbonate the sodium chloride that separated out was removed by filtration, then washed with 2-butene-1-ol, and the water and excess of 2-butene-1-ol distilled off from the filtrate under reduced pressure. There were obtained 217 parts of a clear syrup which showed about 2.7 butenyl ether groups per mol of benzoguanamine.

The reaction product was after-treated in vacuum at 130–150° C. whereby the viscosity was raised. A test portion, as described in Example 1, with an addition of 0.2% cobalt and in a layer of about $20\mu$ thickness was subjected to air drying, and the coating so obtained was dust-dry after 4½ hours at room temperature.

*Example 3*

52 parts of the butenyl ether described in the first paragraph of Example 1 were heated with 9.15 parts of soya-fatty acid under a vacuum of about 300 mm. of mercury to 150° C., and the esterification was finally brought to an end under the full vacuum of the water pump (ca. 12 to 20 mm. of mercury) within about 5 hours. The viscosity of this soya-ester of methylol-melamine butenyl ethers amounted to about 5000 cp.; the bromine number amounted to ca. 1200 mg./g. corresponding to about 4 double bonds per mol of melamine. The product dried, with 0.2% cobalt drier, in about 2½ hours at room temperature, to the dust-dry state, and after about 16 hours was free from tackiness.

*Example 4*

By the use of 75 parts of an air-drying alkyd resin, obtained by interchange of ester radicals of linseed oil with phthalic acid and glycerol (60% linseed, 40% phthalate), which is marketed under the trademark "Moxal 2225," and 25 parts of the methylol-melamine butenyl ether mentioned in the first paragraph of Example 1, or with the soya-fatty acid esterified methylol-melamine butenyl ether described in Example 3, there was obtained an air-drying lacquer and this was compared with the pure alkyd resin lacquer. As drier there was used a mixture of 0.2 percent lead and 0.1 percent cobalt in the form of the naphthenate; the lacquer was diluted with solvents to a pourable viscosity and then poured on to an even glass plate so that a final layer thickness of $20\mu$ resulted. After 16 hours of the surface drying was determined by periodic measurements of the increase in hardness on the Sward hardness gauge. The following results were obtained:

| Experiment No. | Composition lacquer | | Hardness in Sward-Units (glass=100) after— | | | |
|---|---|---|---|---|---|---|
| | Alkyd resin | Butenyl ether | 16 hours | 2 days | 6 days | 14 days |
| | Percent | | | | | |
| (a) | 100 | | 15.7 | 16.0 | 19.3 | 15.0 |
| (b) | 75 | 25% methylol melamine-butenyl ether. | 18.6 | 24.7 | 27.6 | 26.5 |
| (c) | 75 | 25% soya-fatty acid esterified methylol-melamine butenyl ether. | 15.1 | 20.2 | 23.6 | 23.0 |

Obviously, the two butenyl ethers considerably improve the hardness of the alkyd resin used.

Example 5

39 parts of a methylol-melamine ether, containing about 5.2 mol of methoxyl, are reacted with 72 parts of 2-butene-1-ol boiling at 114–116° C. and 0.25 part by volume of hypophosphorous acid of 60% strength in a flask having a stirrer and descending condenser for 4–5 hours at an internal temperature increasing from 70–90° C. The reetherification takes place with slow distillation accompanied by the splitting off of methanol. There are obtained about 5 parts of distillate the greater part of which consists of methanol. The residue is adjusted to a pH value of 8.5 with caustic soda solution. The excess of butenol, about 63 parts, is distilled off at 70–85° C. under a slight vacuum (350 mm. to 120 mm. pressure of mercury) for about one hour and then for ½ hour under a good vacuum of 15 mm. of mercury, and 50.8 parts of a residue are obtained. The last traces of butenol are removed in an oil bath at an internal temperature of 110° C. under 15 mm. of mercury. There are obtained 50.4 parts of a slightly turbid resin, which upon titration with bromine absorb 973 mg. of bromine per gram, which corresponds to about 2.5 mols of butenol per mol of butenol-melamine-ether. The product is dried at room temperature with the addition of 0.1% of cobalt in 15–20 hours to yield a clear hard film, whereby a weight increase of about 9% calculated on the original weight of the film occurs.

Example 6

85 parts of the butenol-melamine ether obtained as described in Example 1 are reacted with 15 parts of linseed oil fatty alcohol with the use of 0.25 part by volume of hypophosphorous acid of 60% strength in a flask having a descending condenser at an internal temperature rising from 50–90° C. under 15 mm. pressure of mercury. There are obtained 7.7 parts of a distillate which consists mainly of butenol, and 88.4 parts of a residue. There remains behind a light yellow clear resin having a viscosity of about 1000 centipoises. The residue is dried with 0.1% of cobalt in about 13–18 hours to form a clear hard film, the weight increase of the film amounting to about 9%.

Example 7

75 parts of butenol-melamine ether obtained as described in Example 1 are heated with 25 parts of linseed oil diglyceride and 0.25 part by volume of hypophosphorous acid of 60% strength in a flask having a descending condenser for 1–1½ hours under atmospheric pressure and at a temperature rising from 85 to 130° C. Little distills over at first. The reaction is then terminated at about 130° C. under 300–350 mm. of mercury, during which about 6 parts of butenol distill over in 30 minutes. 93.2 parts of a yellow clear resin remain behind. After the addition of 0.1% of cobalt, a film about 10μ thick of the composition dries in about 16 hours to a clear hard elastic film, the weight increasing by about 11½% calculated on the quantity of resin in the film.

Example 8

27.6 parts of adipo-guanamine (tetramethylene-bis-6:6'-2:4-diamino-1:3:5-triazine) (½₀ mol) are dissolved with 90 parts by volume of an aqueous formaldehyde solution of 40% strength by volume, which has previously been adjusted to a pH value of 9.0 (1²/₁₀ mol), by heating the mixture under reflux for 15 minutes at 85–90° C., and then the mass is poured on the sheet metal for the purpose of crystallization. After a few hours the mass is white and crystalline, and it is then disintegrated and dried for 4 days. There are obtained 55 parts of a methylol-compound, which contains about 15% of free formaldehyde and has a total content of formaldehyde of 43%.

26.0 parts of the resulting methylol-compound of adipo-guanamine are stirred with 150 parts by volume of butenol, boiling at 114–116° C., in a flask with 5 parts by volume of concentrated hydrochloric acid for about ¾ hours, the internal temperature being maintained at about 25° C. The initially clear solution finally becomes whitish turbid. It is then neutralized with 7 parts of sodium carbonate and 0.5 part by volume of a concentrated solution of caustic soda, the mixture is clarified by filtration, and the excess of butenol is distilled off at an internal temperature of 40–60° C. under 50–15 mm. of mercury in the course of 1½ hours. There are obtained as residue 24.5 parts of a highly viscous turbid syrup, which is filtered off through a suction filter to yield a clear syrup having a viscosity of about 15,000 centipoises. The product has a bromine absorption of about 1080 mg. of bromine per gram, which corresponds to about 4.5 butenol groups per mol of butenol adipo-guanamine ether (=2.25 butenol groups per aminotriazine residue).

After the addition of 0.1% of cobalt, the product is dried in the air for 12–16 hours, whereby a clear hard film is formed with an increase in weight of 7%.

What is claimed is:

1. New ethers of amino-1:3:5-triazines formaldehyde condensation products which contain at least two amino groups bound to the triazine ring and which contain for each amino group at least one N-methylol group which is etherified with 2-butene-1-ol.

2. New ethers of condensation products of formaldehyde and amino - 1:3:5 - triazine which amino-1:3:5-triazines correspond to the formula

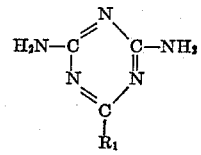

wherein $R_1$ is a member from the class consisting of an amino group, a chlorine atom, an aliphatic hydrocarbon, a cycloaliphatic hydrocarbon, an aromatic hydrocarbon and a radical of the formula

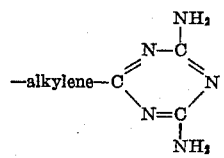

which condensation products contain for each amino group at least one N-methylol group which is etherified with 2-butene-1-ol.

3. New ethers of melamine-formaldehyde condensation products which contain for each amino group at least one N-methylol group which is etherified with 2-butene-1-ol.

4. New ethers of hexamethylol-melamine which contain for each amino group at least one N-methylol group which is etherified with 2-butene-1-ol.

5. New ethers of benzo-guanamine-formaldehyde condensation products which contain for each amino group at least one N-methylol group which is etherified with 2-butene-1-ol.

6. New ethers of adipo-guanamine-formaldehyde condensation products which contain for each amino group at least one N-methylol group which is etherified with 2-butene-1-ol.

7. New ethers of amino-1:3:5 triazine formaldehyde condensation products which contain at least two amino groups bound to the triazine ring and which contain for each amino group at least one N-methylol group which is etherified with 2-butene-1-ol, and in which condensation products at least one N-methylol group is etherified with a saturated aliphatic alcohol of low molecular weight.

8. New ethers of amino-1:3:5-triazine formaldehyde condensation products which contain at least two amino groups bound to the triazine ring and which contain for each amino group at least one N-methylol group which is etherified with 2-butene-1-ol, and in which condensation products at least one N-methylol group is etherified with a partial ester of glycerol with a high molecular weight and unsaturated fatty acid having air drying properties.

9. New ethers of amino-1:3:5-triazine formaldehyde condensation products which contain at least two amino groups bound to the triazine ring and which contain for each amino group at least one N-methylol group which is etherified with 2-butene-1-ol, and in which condensation products at least one N-methylol group is etherified with a partial ether of glycerol with a high molecular weight and unsaturated fatty alcohol having air drying properties.

10. New ethers of amino-1:3:5-triazine formaldehyde condensation products which contain at least two amino groups bound to the triazine ring and which contain for each amino group at least one N-methylol group which is etherified with 2-butene-1-ol, and in which condensation products at least one N-methylol group is etherified with a high molecular weight and unsaturated fatty alcohol having air-drying properties.

11. New ethers of aminotriazine formaldehyde condensation products which contain at least two amino groups bound to the triazine ring and which contain for each amino group at least one N-methylol group which is etherified with 2-butene-1-ol and in which condensation product at least one N-methylol group is esterified with a high molecular weight and unsaturated carboxylic acid having drying properties.

12. An oxidatively drying composition which comprises an ether of an amino-1:3:5-triazine formaldehyde condensation product which contains at least two amino groups bound to the triazine ring and which contains for each amino group at least one N-methylol group which is etherified with 2-butene-1-ol, and a metallic drier.

13. An oxidatively drying composition which comprises an ether of an amino-1:3:5-triazine formaldehyde condensation product which contains at least two amino groups bound to the triazine ring and which contains for each amino group at least one N-methylol group which is etherified with 2-butene-1-ol, a metallic drier and a peroxide catalyst.

14. An oxidatively drying composition which comprises an ether of an aminotriazine formaldehyde condensation product which contains at least two amino groups bound to the triazine ring and which contains for each amino group at least one N-methylol group which is etherified with 2-butene-1-ol, and a cobalt drier.

References Cited in the file of this patent
UNITED STATES PATENTS

| | | |
|---|---|---|
| 2,197,357 | Widmer | Apr. 16, 1940 |
| 2,609,358 | Pfann et al. | Sept. 2, 1952 |
| 2,764,574 | Widmer | Sept. 25, 1956 |
| 2,914,508 | Williams et al. | Nov. 24, 1959 |